US 6,699,152 B2
Mar. 2, 2004

(54) SPEED REDUCTION GEAR

(75) Inventor: Minoru Tanaka, Mie (JP)

(73) Assignee: Teijin Seiki Co., Ltd., Tokyo (JP)

( * ) Notice: Subject to any disclaimer, the term of this patent is extended or adjusted under 35 U.S.C. 154(b) by 0 days.

(21) Appl. No.: 10/123,327

(22) Filed: Apr. 16, 2002

(65) Prior Publication Data

US 2002/0155915 A1 Oct. 24, 2002

(30) Foreign Application Priority Data

Apr. 18, 2001 (JP) ...................................... P2001-120321

(51) Int. Cl.⁷ .............................................. F16H 48/06
(52) U.S. Cl. ...................... 475/149; 74/490.03; 901/23
(58) Field of Search ...................... 74/490.03; 475/149; 901/23

(56) References Cited

U.S. PATENT DOCUMENTS 4,151,390 A * 4/1979 Bisiach .................... 219/124.1
4,738,576 A * 4/1988 Eberle et al. ................... 414/4
5,606,235 A * 2/1997 Mauletti ...................... 318/625
6,014,909 A * 1/2000 Fiora ........................ 74/490.02
6,119,542 A * 9/2000 Arbrink ..................... 74/490.03
6,389,921 B1 * 5/2002 Nada ........................ 74/490.02

FOREIGN PATENT DOCUMENTS

JP                    8-3733 Y2        1/1996

* cited by examiner

*Primary Examiner*—Dirk Wright
(74) *Attorney, Agent, or Firm*—Akin Gump Strauss Hauer & Feld, LLP

(57) ABSTRACT

A reduction gear which facilitates the mounting of a motor while securing a hollow space in a portion of the rotation center of the reduction gear, and which makes it possible to easily change the reduction ratio. A hollow space is formed in a portion of the rotation center of a reduction gear, a motor mounting member (24) for maintaining a distance between the center of rotation and a rotating shaft of the motor to a fixed distance, and a front-stage reducing portion (32) for reducing the output rotation of the motor is provided between the center of rotation and the rotating shaft of the motor.

12 Claims, 2 Drawing Sheets

SPEED REDUCTION GEAR

BACKGROUND OF THE INVENTION

The present invention relates to a reduction gear in which a hollow space is formed in a portion of its rotation center, and more particularly to a reduction gear provided with a motor mounting portion.

As a related reduction gear, one disclosed in, for example, JP-B-8-3733U is known. This reduction gear is an eccentric oscillatory reduction gear in which an input gear for the reduction gear coupled with a hollow output shaft of a motor and a transmission gear provided on an eccentric member shaft for causing an external gear to undergo eccentric motion are combined and which has a front-stage meshing portion. The rotating shaft of this reduction gear is coaxial with the rotating shaft of the motor, and a hollow space is formed in the portion of the rotation center of the reduction gear.

With the above-described related reduction gear, however, since the wiring, piping and the like are passed in the rotating shaft of the motor which rotates at high speed, in cases where the rotating shaft of the motor is brought into contact with such wiring, piping or the like, there has been a problem in that the wiring, piping or the like is damaged.

Furthermore, in the field of reduction gears, although it is necessary to provide a rich assortment of reduction ratios to meet customer needs, even if an attempt is made to vary the reduction ratio at the front-stage meshing portion in this reduction gear, the only way to make this possible is to make the diameter of the input gear large and make the diameter of the transmission gear small. In this case, the front-stage meshing portion is undesirably set for speed increasing, so that it is impossible to provide a rich assortment of reduction ratios. Furthermore, the diameter of the input gear can be made small to set this front-stage meshing portion in a reducing relationship, but if such an arrangement is adopted, it becomes impossible to secure a hollow diameter portion.

In view of the above-described problems of the related art, the object of the invention is to provide a reduction gear which facilitates the assortment of reduction ratios of the reduction gear and is capable of having a large space in the hollow diameter portion.

SUMMARY OF THE INVENTION

The above object can be attained by a reduction gear in which a hollow space is formed in a portion of a rotation center, and the center of rotation and a rotating shaft of a motor are arranged in parallel, characterized in that a motor mounting member for maintaining a distance between the center of rotation and the rotating shaft of the motor to a fixed distance, and that a front-stage reducing portion for reducing the output rotation of the motor is provided between the center of rotation and the rotating shaft of the motor.

According to this reduction gear, the mounting of the motor is facilitated while securing a hollow space in the portion of the rotation center of the reduction gear, and the reduction ratio can be changed easily.

In addition, since an input gear member of the front-stage reducing portion is held in the motor mounting member as described in claim 2, the coupling of the motor can be effected easily by fixing the motor to the motor mounting member.

The present disclosure relates to the subject matter contained in Japanese patent application No. 2001-120321 (filed on Apr. 18, 2001), which is expressly incorporated herein by reference in its entirety.

DESCRIPTION OF THE PREFERRED EMBODIMENT

Figure 1:
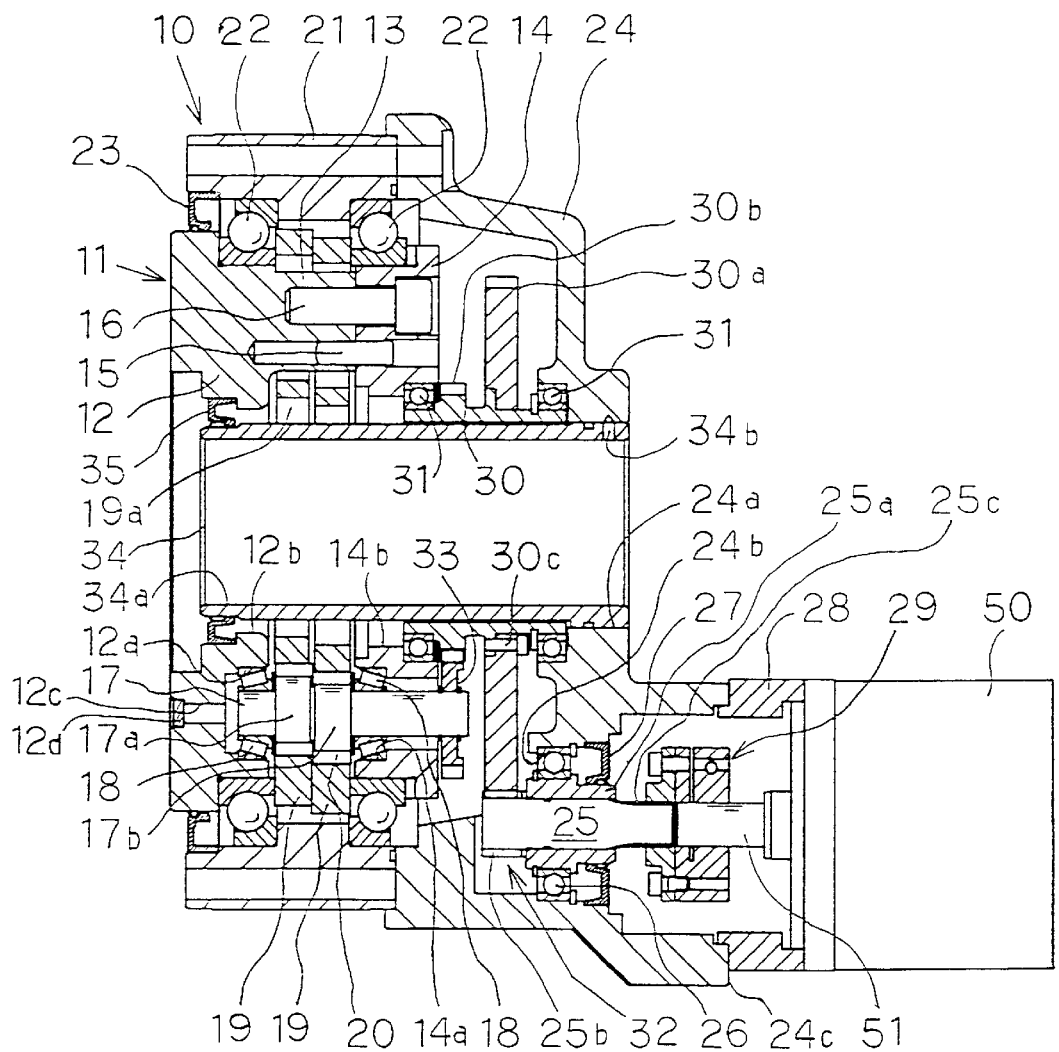
FIG. 1 is a side cross-sectional view of an embodiment of the invention.

Referring now to the drawings, a description will be given of an embodiment of the invention.

In FIG. 1, reference numeral 10 denotes a reduction gear in accordance with this embodiment, and a motor 50 is mounted on one side surface of the reduction gear 10. The arrangement provided is such that the center of rotation of the reduction gear 10 and a rotating shaft 51 of the motor are parallel to each other. The reduction gear 10 is an eccentric oscillatory reduction gear in which two external gears 19 undergo eccentric motion, but the reduction gear of the invention is not limited to the same.

A description will be given of the structure of the eccentric oscillatory reduction gear 10 which is used in this embodiment.

Reference numeral 11 denotes a supporting unit for the reduction gear 10, and the supporting unit 11 consists of a basal disk 12 having a plurality of cylindrical portions 13 as well as an end plate 14 which abuts against ends of the cylindrical portions 13 and is connected thereto by means of tightening pins 15 and tightening bolts 16.

In the basal disk 12, a plurality of bearing-use holes 12a are provided between adjacent ones of the plurality of cylindrical portions 13, and a central hole 12b is provided in a central portion. Further, a plurality of bearing-use holes 14a and a central hole 14b are provided in the end plate 14 in correspondence with the bearing-use holes 12a and the central hole 12b formed in the basal disk 12.

An eccentric member shaft 17 having two eccentric member portions 17a and 17b which are formed integrally and have different phases 180° eccentric to each other is rotatably supported in the bearing-use holes 12a and 14a by means of a pair of tapered roller bearings 18. Further, the external gears 19 are respectively fitted on the eccentric member portions 17a and 17b by means of a pair of needle bearings 20, and as the eccentric member shaft 17 rotates, the external gears 19 undergo oscillatory motion. In an end portion of the basal disk 12, an adjustment hole 12c is formed in the axial direction of the center of the eccentric member shaft 17 so as to adjust the preload for the tapered roller bearings 18. A seal cap 12d is detachably fitted to an end face portion of the adjustment hole 12c.

Epitrochoidal tooth forms are formed on outer peripheries of the external gears 19, and mesh with pins (internal teeth) which are respectively held in a plurality of semicircular grooves formed on an inner periphery of an internal gear 21 in such a manner as to be distributed at equal intervals. The number of the internal teeth is slightly larger than the number of the external teeth of the external gear 19. A pair of main bearings 22 are provided between the internal gear 21 and the supporting unit 11, and an oil seal 23 is provided between the internal gear 21 and the basal disk 12 of the supporting unit 11 on the outer side of the main bearing 22.

A motor mounting member 24 is fixed to the internal gear 21 by means of bolts (not shown). The motor mounting member 24 has a central hole 24a provided at a portion of the rotation center of the reduction gear 10 as well as an input-gear supporting hole 24b provided at a position spaced apart from the portion of the rotation center so as to support an input gear member 25. The input gear member 25 is fitted to a bearing housing 25a by press fitting. The input gear member 25 which is integral with the bearing housing 25a is rotatably supported in the input-gear member 25 by means of a bearing 26. An oil seal 27 for sealing in a lubricating oil inside the reduction gear 10 is provided in the input-gear supporting hole 24b on the outer side of the bearing 26. An input gear 25b is formed at one end of the input gear member 25 and is inserted into the reduction gear on the inner side of the bearing 26, and splines 25c are formed at the other end thereof and project to the outside from the reduction gear. The bearing housing 25a may not be particularly provided.

A mounting base portion 24c is formed on the motor mounting member 24, and the motor 50 is mounted thereon by bolts (not shown) with an intermediate flange 28 interposed therebetween. A coupling 29 is fitted on the motor rotating shaft 51, and is adapted to be connected to the splines 25c of the reduction gear 10. Since the motor 50 is provided in such a manner as to be substantially offset from the center of rotation of the reduction gear 10, the outer shape of the motor 50 does not extend into the hollow space of the reduction gear, so that maximum use can be made of the hollow diameter portion (large inside diameter portion 34a).

A hollow cylindrical intermediate gear 30 is provided in the portion of the rotation center of the reduction gear 10 between the reduction gear 10 and the motor mounting member 24, and is rotatably supported in the central hole 14b of the end plate 14 of the supporting unit 11 and the central hole 24a of the motor mounting member 24 by means of a pair of bearings 31. Two gears, i.e., a large gear 30a and a small gear 30b, are provided as the intermediate gear 30, and the large gear 30a meshes with the aforementioned input gear 25b and constitutes a front-stage reducing portion 32. It is possible to provide at least two or more kinds of reduction ratios by changing the outside diameters of the large gear 30a and the input gear 25b. Since the large gear 30a is detachably mounted on a main body of the intermediate gear 30 by bolts 30c, the large gear 30a is easily interchangeable. In addition, the small gear 30b meshes with a transmission gear 33 provided at one end of the eccentric member shaft 17. In the same way as the large gear 30a, the small gear 30b can be detachably mounted on the main body of the intermediate gear 30.

As a hollow cylindrical shaft 34 having the large inside diameter portion 34a (hollow diameter portion) in its center, it is preferable to use a steel pipe such as a carbon steel for machine structural use (STKM). A fitting portion formed at one end of the hollow cylindrical shaft 34 is fitted in the central hole 24a of the motor mounting member 24, and is fixed by a plurality of set screws 34b (may be fixed by bonding, press fitting, or the like). The other end of the hollow cylindrical shaft 34 is inserted in the intermediate gear 30, the central hole 14b in the end plate 14, central holes 19a in the external gears 19, and the central hole 12b in the basal disk 12, and an oil seal 35 is provided between an outer periphery of the other end and the central hole 12b of the basal disk 12.

The lubricating oil in the reduction gear 1 is sealed in by the oil seals 23, 27, and 35 and the seal cap 12d so as not to flow out to the outside.

Figure 2:
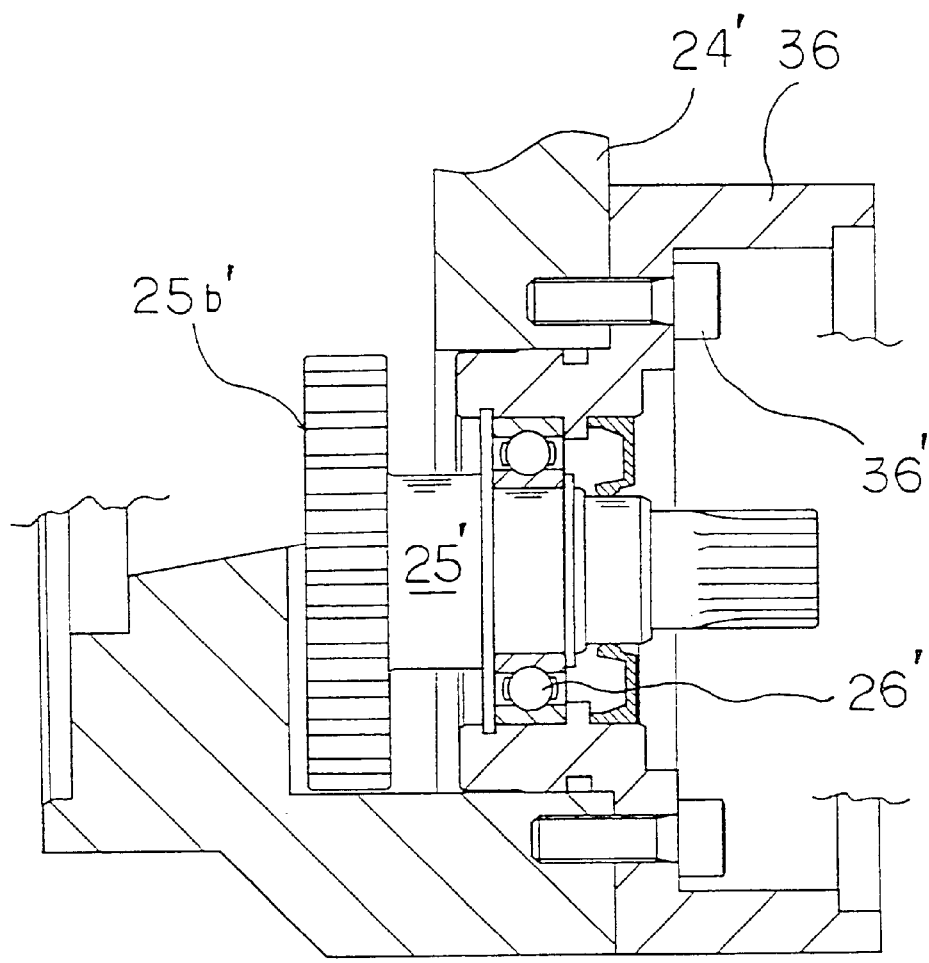
FIG. 2 is a partial cross-sectional view of a front-stage reducing portion in accordance with the invention.

FIG. 2 shows an example in which the outside diameter of an input gear 25b' is made large in a case where the front-stage reducing portion is set for low reduction. The outside diameter of the large gear 30a is made small correspondingly. In this case, it is preferable to split the motor mounting member 24 into the main body of the motor mounting member and a holding member. Namely, the input gear member 25' is fitted to a holding member 36 by means of a bearing 26', and the holding member 36 is fixed to a motor-mounting-member main body 24' by means of bolts 36'.

Although the invention has been described by using the embodiments, the invention is not limited to these embodiments, and various modifications are possible within the scope of the technical concept of the invention. For example, a hollow eccentric member shaft having a large space formed in its center is disposed in the rotation center of the reduction gear, an eccentric member is fitted in a central hole of an external gear by means of bearings, and as the hollow eccentric member shaft rotates, the external gear is made to undergo eccentric motion. Further, both ends of the hollow eccentric member shaft are rotatably supported in the central hole of the motor mounting member and the central hole of the basal disk. An intermediate gear for meshing with the input gear may be fitted to the hollow eccentric member shaft.

In accordance with the invention, since the motor mounting member for maintaining the distance between the center of rotation and the rotating shaft of the motor to a fixed distance, and the front-stage reducing portion for reducing the output rotation of the motor is provided between the center of rotation and the rotating shaft of the motor, the mounting of the motor is facilitated while securing a hollow space in the portion of the rotation center of the reduction gear, and the reduction ratio can be changed easily.

What is claimed is:

1. A reduction gear in which a hollow space is formed in a hollow shaft, the hollow shaft including a central axis, the central axis and a rotating shaft of a motor are arranged in parallel, the reduction gear comprising:
   a motor mounting member for maintaining a fixed distance between the central axis and said rotating shaft of said motor;
   a front-stage reducing portion for reducing the output rotation of said motor; and
   a coaxial speed reducing mechanism that is coaxial with the central axis.

2. The reduction gear according to claim 1, wherein an input gear member of said front-stage reducing portion is held in said motor mounting member.

3. The reduction gear according to claim 1 wherein the front-stage reducing portion is provided between the central axis and said rotating shaft of said motor.

4. The reduction gear according to claim 1 wherein the coaxial speed reducing mechanism is an eccentric oscillatory reduction gear mechanism.

5. The reduction gear according to claim 1 wherein the front-stage reducing portion includes a first gear that is interchangeable with a second gear, the first gear being larger than the second gear; and
   a first input gear that is interchangeable with a second input gear, the first input gear being larger than the second input gear, the first gear and second input gear comprising a portion of the front-stage reducing portion in a first configuration and the second gear and first input gear comprising a portion of the front-stage reducing portion in a second configuration.

6. A reduction gear in which a hollow space is formed in a hollow shaft, the hollow shaft including a central axis, the central axis and a rotation shaft of a motor are arranged in parallel, the reduction gear comprising:

an eccentric member shaft that orbits about the central axis;

an external gear rotatably mounted on the eccentric member shaft;

an internal gear drivingly engaged with the external gear;

a supporting unit that rotates about the central axis, the supporting unit rotatably supporting the eccentric member shaft;

a motor mounting member maintaining a fixed distance between the central axis and said rotating shaft of said motor; and a first gear drivingly engaged with a motor shaft gear, the motor shaft gear being secured to the rotation shaft of the motor, the first gear being larger than the motor shaft gear.

7. A reduction gear for reducing an input rotational speed of a motor to an output rotational speed comprising:

a motor including a rotating shaft that provides the input rotational speed;

a hollow shaft having a central axis, the hollow shaft being fixed relative to the motor, the central axis being located in parallel to a center of rotation of the rotating shaft;

a front-stage speed reducing mechanism that reduces the input rotational speed; and a coaxial speed reducing mechanism further reducing the rotational speed output from the front-stage speed reducing mechanism, the coaxial speed reducing mechanism outputting the output rotational speed and having a center of rotation coaxial with the central axis.

8. The reduction gear according to claim 7 wherein the coaxial speed reducing mechanism includes:

an eccentric member shaft that orbits about the central axis;

an external gear rotatably mounted on the eccentric member shaft;

an internal gear drivingly engaged with the external gear; and a supporting unit that rotates about the central axis, the supporting unit rotatably supporting the eccentric member shaft.

9. The reduction gear according to claim 8 further comprising:

a motor mounting member maintaining a fixed distance between the central axis and said rotating shaft of said motor.

10. The reduction gear according to claim 7 wherein the coaxial speed reducing mechanism includes:

a center shaft that is rotationally provided in accordance with an input from the rotation shaft of the motor;

an external gear that orbits about the center shaft;

an internal gear drivingly engaged with the external gear; and a supporting unit that rotates about the central axis, the supporting unit rotatably supporting the external gear.

11. The reduction gear according to claim 10 further comprising:

a motor mounting member maintaining a fixed distance between the central axis and said rotating shaft of said motor.

12. A reduction gear in which a hollow space is formed in a hollow shaft, the hollow shaft including a central axis, the central axis and a rotation shaft of a motor are arranged in parallel, the reduction gear comprising:

a center shaft that is rotationally provided in accordance with an input from the rotation shaft of the motor;

an external gear that orbits about the center shaft;

an internal gear drivingly engaged with the external gear;

a supporting unit that rotates about the central axis, the supporting unit rotatably supporting the external gear;

a motor mounting member maintaining a fixed distance between the central axis and said rotating shaft of said motor; and a first gear drivingly engaged with a motor shaft gear, the motor shaft gear being secured to the rotation shaft of the motor, the first gear being larger than the motor shaft gear.

* * * * *